United States Patent [19]
Jackson et al.

[11] Patent Number: 5,754,690
[45] Date of Patent: May 19, 1998

[54] POSITION SENSITIVE DETECTOR BASED IMAGE CONVERSION SYSTEM CAPABLE OF PRESERVING SUBPIXEL INFORMATION

[75] Inventors: Warren B. Jackson, San Francisco; David A. Jared, Sunnyvale, both of Calif.; Sumit Basu, Cambridge, Mass.; David K. Biegelsen, Portola Valley, Calif.

[73] Assignee: Xerox Corporation, Stamford, Conn.

[21] Appl. No.: 548,994

[22] Filed: Oct. 27, 1995

[51] Int. Cl.⁶ .............................. G06K 9/48; G06K 9/36; G06K 9/32
[52] U.S. Cl. .................. 382/199; 382/288; 382/299
[58] Field of Search .................................. 382/199, 288, 382/299, 274, 275; 358/461

[56] References Cited

U.S. PATENT DOCUMENTS

| | | | |
|---|---|---|---|
| 4,771,471 | 9/1988 | Kitamura | 382/41 |
| 4,979,221 | 12/1990 | Perryman et al. | 382/100 |
| 5,115,476 | 5/1992 | Ito | 382/199 |
| 5,351,309 | 9/1994 | Lee et al. | 382/199 |
| 5,541,652 | 7/1996 | Jackson et al. | 348/332 |
| 5,578,837 | 11/1996 | Jackson et al. | 257/53 |

OTHER PUBLICATIONS

Lindholm, Lars and Edwards, Ian K., "Analog position sensing photodetectors: new life for an old technology", Photonics spectra, vol. 25, No. 11, p. 149, Nov. 1991.

Forte, P. "A simple method of segmentation with subpixel accuracy." IEE, Third International Conference on Image Processing and Its Applications (Conf. Publ. No. 307), 1989, pp. 403–405.

Kisworo, M. et al. "Modeling Edges at Subpixel Accuracy Using the Local Energy Approach." IEEE Transactions on Pattern Analysis and Machine Intelligence, vol. 16, No. 4, Apr. 1994, pp. 405–411.

Lyvers, E.P. et al. "Subpixel measurements using a moment-based operator." IEEE Transactions on Pattern Analysis and Machine Intelligence, vol. 11, Iss. 12, Dec. 1989, pp. 1293–1309.

Mullikin, J.C. "Boundary description and measurement with sub–pixel/–voxel accuracy." IEEE Comput. Soc. Press, Proceedings. 11th IAPR International Conference on Pattern Recognition. vol. III. Conference C: Image, Speech and Signal Analysis, Aug. 30–Sep. 3, 1992, pp. 6–8.

Nalwa, V.S. et al. "On Detecting Edges." IEEE Transactions on Pattern Analysis and Machine Intelligence, vol. PAMI–8, No. 6, Nov. 1986, pp. 699–715.

Tabatabai, A.J. et al. "Edge Location to Subpixel Values in Digital Imagery." IEEE Transactions on Pattern Analysis and Machine Intelligence, vol. PAMI–6, No. 2, Mar. 1984, pp. 188–201.

Xu, C. et al. "Precise localization of geometrically known image edges in noisy environment." IEEE. IECON '90. 16th annual Conference of IEEE Industrial Electronics Society (Cat. No. 90CH2841–5), 1990, vol. 1, pp. 346–349.

Primary Examiner—Yon J. Couso
Assistant Examiner—Ha Tran Nguyen
Attorney, Agent, or Firm—Robert A. Burtzlaff

[57] ABSTRACT

An image detection and pixel processing system includes a plurality of position sensitive detector elements arranged to receive an image. Each position sensitive detector element provides information for determining both a total light intensity value within the position sensitive detector element and a centroid of light intensity indicative of light intensity position within the position sensitive detector element. An image processing assembly receives information from the plurality of position detector elements with the image processing assembly relating a pixel and its encompassed subpixel area to each corresponding position detector element. The total light intensity within the pixel and the centroid of light intensity within the subpixel is determined, with the image processing assembly rendering each subpixel area as an edge when magnitude of the centroid of light intensity is large.

11 Claims, 4 Drawing Sheets

POSITION SENSITIVE DETECTOR BASED IMAGE CONVERSION SYSTEM CAPABLE OF PRESERVING SUBPIXEL INFORMATION

FIELD OF THE INVENTION

The present invention relates to an imaging system capable of detecting and preserving non-periodic high frequency spatial information in images. More particularly, the present invention relates to an imaging system that utilizes position sensitive detectors to increase edge detection response in captured or scanned digital images.

BACKGROUND AND SUMMARY OF THE INVENTION

The human eye's response to high spatial frequency content in images is highly dependent on the nature of the features. For example, the eye integrates certain types of high frequency intensity variations, such as closely spaced black dots or lines, by smoothing them to present an appearance of solid gray. In contrast, other types of high frequency intensity variations, such as high contrast edges or mismatched lines, are not smoothed. Edge or line misalignments remain detectable at even very high spatial frequencies. Vision research has determined that for a pattern of adjacent vertical strips of 0% and 100% intensities (black and white, respectively), the ability of the human visual system to distinguish the pattern from uniform gray drops off significantly at around 150 cycles/inch for a standard viewing distance of 12". For lower levels of contrast between the intensities, the response drops off at even lower spatial frequencies. Yet, the visual system remains extremely sensitive to high contrast (non-periodic) steps in an image, such as black-white edges. Though edges contain information at frequencies far higher than 150 cycles/inch, the visual system does not significantly smooth or blur the edge, remaining sensitive to its exact position. This property of the human visual system has been termed hyperacuity, since it permits an effective acuity for certain classes of objects as much ten times normal visual acuity. The hyperacuity effect can be easily observed by looking at page having closely spaced lines, with some lines being broken and shifted slightly to provide a line mismatch. When the page is held far enough away, the majority of lines will appear to blend into continuous tones, but comparably sized small projections where the lines do not match will remain sharp and clear.

Unfortunately, the hyperacuity of human vision presents certain problems for digital imaging devices such as scanners. The problem is particularly acute in documents or media containing both text and photographic or halftoned images. A scanner is required to render photos or halftoned images in a document as continuous gray tones, yet must still be able to place text edges with high pixel accuracy. Several different approaches have been pursued to address this problem. Commonly, preprocessing of the image is utilized to segment the document into text and image portions. Text-like features are identified in a document and processed separately from the halftoned or continuous images. Typically, processing algorithms that enhance line features are used with text, while smoothing algorithms are used with the halftone or continuous images. While this improves image quality, reliable automatic segmentation algorithms are difficult to develop, and segmentation often fails when text is embedded in a continuous tone image.

Instead of segmentation, an alternative approach relies on an increase in the density of the scanning elements (also referred to as "pixel elements") to improve resolution. However, while this improves overall image quality, it is usually not an efficient or economic solution. Consider, for example, an image that has a solid black circle in the center of a white background. A typical scanning system win take the average intensity incident on each pixel element. At lower scanning densities and resolutions, this approach results in jagged lines that did not exist in the original image. Sampling at higher and higher resolutions certainly reduces the visibility of these features at the boundary between black and white regions, but also results in sampling constant-intensity black or white regions at an unnecessarily high resolution. In practice, the high cost of extremely dense scanning elements, coupled with the associated increase in memory storage requirements and image processing times, has prevented development of imaging systems with a response approaching that characteristic of human hyperacuity.

Accordingly, an object of the present invention is to provide an imaging system capable of reconstructing visually significant sub-detector-sized features in scanned images (at a hyperacuity level resolution) using detectors and processing methods having subpixel response, obviating the need for high density scanning elements or segmentation of an image. Subpixel resolution detectors can include arrays of position sensitive detectors ("PSD's"), p-i-n junction devices that have contacts at each edge of each PSD element held at a virtual ground. When visible light or other type of incident radiation (e.g. ultraviolet, infrared, etc.) strikes a suitably biased PSD element, electron-hole charge pairs are generated in the intrinsic layer (i-layer). The electrons are separated from the holes by the electric field between the p-layer and the n-layer, with electrons tending to flow toward the n-layer and holes tending toward the p-layer. The electrons in the n-layer then flow to the edge contacts (all held at equal potential) with currents at each contact linearly proportional to the distance between the point of charge generation (corresponding to the point of incident light) and the contact. If the current at each edge is measured, the position of the incident light can be determined. Further, since any general distribution of intensity (multiple incident light events) can be derived from superpositions of this single-point case, calculation of a centroid of light intensity within each PSD element is possible. In practice, image detection and processing in accordance with the present invention using arrays of PSD's provides image information having a greater effective resolution than that possible with conventional p-i-n detectors that do not provide such incident light position information.

Another object of the present invention is to allow faithful rendering and reproduction of documents having visually significant features in both text and continuous tones without prior segmentation. The rendering must accurately reproduce features that would be visible to a hyperacuity capable human eye at normal viewing distances. The present invention allows for subpixel resolution of critical high contrast edge and line features, while still smoothly integrating periodic high frequency features used to simulate continuous tones.

Yet another object of the present invention is to provide a computationally efficient one pass method for rendering visually significant features in an image. In contrast to prior art methods requiring segmentation, or isolation of edge features spanning large areas of an image, the method of the present invention only requires a single pass over the image. This can advantageously save significant time during processing and rendering.

Still another object of the present invention is to provide a processing method that operates locally, and does not require extensive sampling of adjacent pixels during image rendering. Operation of the apparatus or method of the present invention does not require much contextual information concerning light intensity in nearby pixels, typically requiring only gray level information from at most two adjacent pixels, and often requiring information from only one adjacent pixel. Again, this reduces processing time, and has the additional advantage of reducing overall image errors. Since local errors in rendering do not propagate outside the detector area (a single pixel), the possibility of creating visually perceptible artifacts during rendering are greatly reduced as compared to prior art global image rendering techniques.

Another object of the present invention is to provide an apparatus and method that is intensity-conserving. In other words, the total intensity of the rendered output representation for a given PSD detector is always equal to the total intensity incident on the PSD detector. Conserving the intensity is crucial in preserving the appearance of the image. At a large enough viewing distance for a given size of image area, two areas in an image that contain the same total intensity will appear substantially identical to the eye. The rendered output in accordance with the present invention accordingly appears very similar to the gray model at the viewing distance corresponding to the area of one detector, regardless of how poorly edges or continuous features are modeled. Although details may be lost and moire patterns may appear, the conservation of gray at the PSD detector level prevents artifacts and gross errors from occurring over a large region of the image.

A minor advantage of the present invention is the ability to extract segmentation information from edge information determined during rendering. As previously discussed, segmentation refers to the process of dividing an image into several regions according to the category of image content (i.e., regions of text, regions of halftoned images, etc.). Since the rendered output for text and line art images contains a large fraction of detectors with edges, while the output for continuous tone images has a much smaller fraction, the fraction of edge-containing detectors for a given area of an image can be used as a statistical measure to determine whether that area of the image contains text or illustrations. The segmentation information derived from practice of the apparatus or method of the present invention can be useful for systems that do require segmentation, such as an optical character recognition system for text analysis.

In accordance with the aforesaid objects and advantages, the present invention provides an image detection and pixel processing system having a plurality of position sensitive detector elements arranged to receive an image. Each position sensitive detector element provides information for determining both a total light intensity value within the position sensitive detector element and a centroid of light intensity indicative of light intensity position within the position sensitive detector element.

An image processing assembly is connected to receive information from the plurality of position detector elements, with the image processing assembly relating a pixel and its encompassed subpixel area to each corresponding position detector element. The image processing assembly further determines the total light intensity within the subpixel, and the centroid of light intensity within the subpixel, with the image processing assembly rendering each subpixel area as an edge when magnitude of the centroid of light intensity is large.

In preferred embodiments, the image processing assembly renders the subpixel area as an edge by finding a first gray value on a first side of the edge, determining actual edge position, and using actual edge position and the first gray value to determine a second gray value on a second side of the edge opposite the first side of the edge. The actual edge position can be further determined by partially determining parameterization of the edge using gray-on-gray moments, and converting gray-on-gray moments to gray-on-black to uniquely define edge location. For best computational efficiency, determining parameterization of the edge using gray-on-gray moments uses lookup tables instead of explicit calculation of edge parameters. The lookup tables are used to map moments of the centroid of light intensity onto an edge parameter.

In a most preferred embodiment, the image processing assembly renders the subpixel area as an edge when the magnitude of the centroid of light intensity is greater than about ⅓ (where the centroid can vary between 0 and 1). When the centroid of light intensity is smaller than that threshold, the intensity variation within the pixel is determined using a plane or bilinear model of intensity, and no edge features are located within the pixel.

As will be appreciated by consideration of the present invention, output for each pixel corresponding to a PSD detector element is a set of four parameters, describing either the position, orientation, and intensity levels of an edge or the coefficients for a continuous description (either plane model or bilinear model). Advantageously, since this is an analytic description of the subpixel area, operations such as scaling and rotation are relatively simple: the representation can be held constant, while the area of the output image corresponding to each detector can be scaled or rotated. As long as a transformation can be found between a point on the original location of the detector to the new coordinate system of the rendered pixel in an image, the rendering can be performed on these transformed coordinates. In contrast, conventional scanned image representations in which only the average intensity for each detector is extracted from the scan (i.e., a grayscale representation) do not have as much flexibility in scaling or rotation. While edges in a conventional scanned image may appear smooth when each detector corresponds to one or a few pixels in the image, the square shape of each detector's area becomes apparent as the image is magnified (scaled upward). The analytic description is also of great use in resolution conversion. Conversions to arbitrary resolutions while maintaining edge information is straightforward.

Additional objects, advantages, and features of the present invention will become apparent from consideration of the following description and drawings of preferred embodiments.

DETAILED DESCRIPTION OF THE INVENTION

Figure 1:
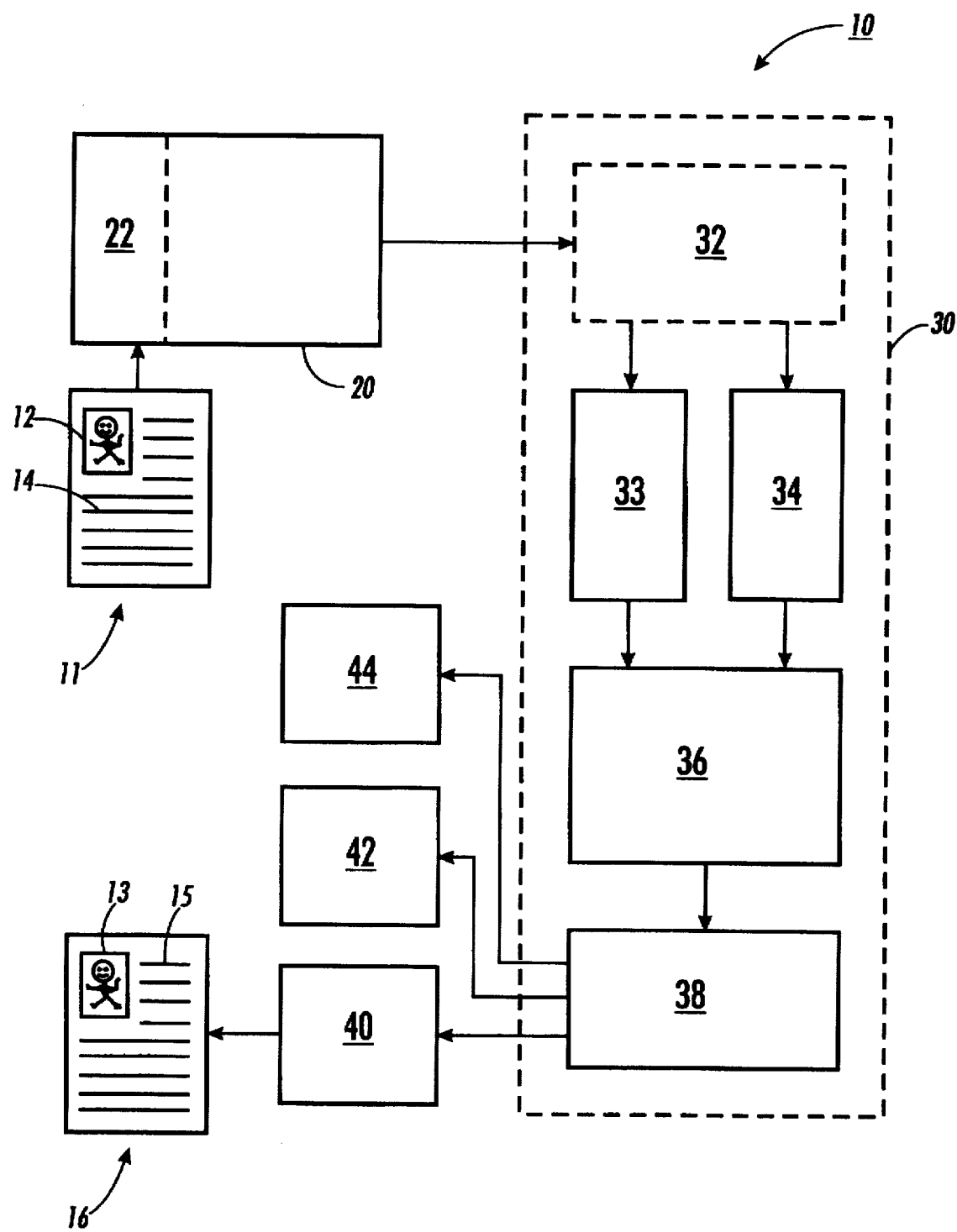
FIG. 1 is a schematic outline of a document processing system, including a scanner having position sensitive detectors to digitally scan documents incorporating both text and figures, an image processing assembly in accordance with the invention, and output devices such as video displays or printers.

A document processing system 10 suitable for digitally scanning, image processing, rendering, and displaying a document 11 having both a FIG. 12 and text 14 is shown in FIG. 1. Digital scanning is accomplished with a scanner 20 incorporating a detector array 22. In one preferred embodiment, the detector array 22 is a two dimensional array sized to correspond to a typical page to be scanned, permitting essentially simultaneous capture of the entire page image. Alternatively, a sufficiently long linear array can be used to scan a "window" having a width of a conventional sized page, with the position of the scanning window being moved lengthwise along the page (by physical movement of the detector array 22 or optical movement of the scanning window using rotating mirrors, prisms, etc.). As will be appreciated, alternative scanning schemes, including the use of multiple independent arrays scanning contiguous sections of a document 11, can of course be employed.

The scanner 20 directs signals corresponding to the detected light levels by the detector array 22 to an image processing assembly 30. The image processing assembly 30 can be a general purpose serial or parallel computer having an accessible memory 32 and processor(s) attached by a network (not shown) to the scanner 20, or alternatively can include dedicated hardware directly incorporated into the body of the scanner. The memory 32 of the image processing assembly 30 is used to store the digital representation of a light intensity map corresponding to a document 11 that is received from the scanner 20, along with any other additional light or image related information that may be available. The received information is processed by a light intensity unit 33 to determine a total light intensity in each pixel and a moment calculation unit 34 to determine the centroid of light intensity within each pixel. This combined information is used by a gray level rendering unit 36 to determine the appropriate gray level for each rendered pixel in a constructed bitmap (not shown). The bitmap is transferred to a device specific conversion unit 38 to transform the bitmap into a form suitable for printing by a printer 40 (providing reproduced document 16 with reproduced FIG. 13 and reproduced text 15). Alternatively, the device specific conversion unit 38 can provide signals suitable for transient display of the reproduced document on a video display 42, long term storage in a storage unit 44 (which may include magnetic disk or optical storage) as a bitmap or proprietary image file, or use in conjunction with any other conventional output device.

Figure 2:
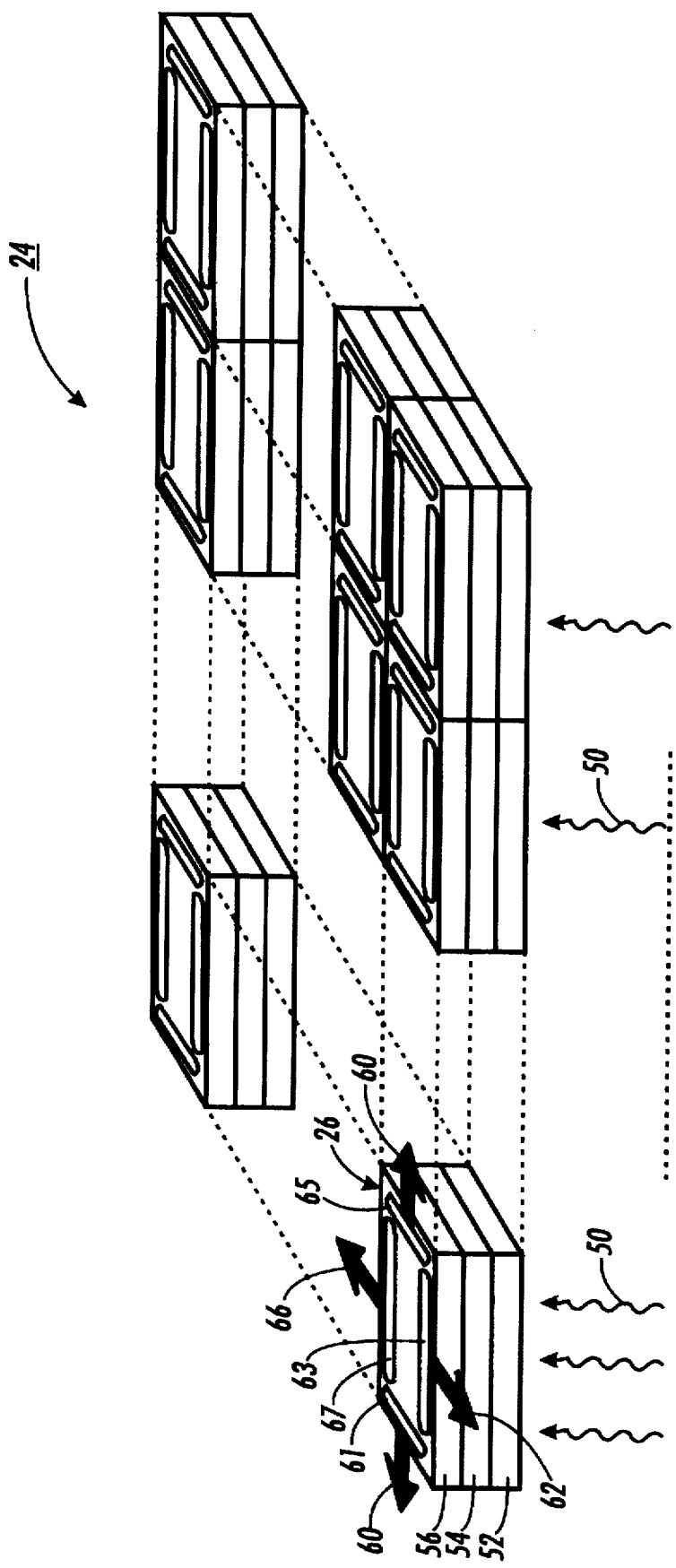
FIG. 2 illustrates a two dimensional position sensitive detector (PSD) array, with input and output for a single PSD being shown.

Operation of the image processing assembly 30 requires information concerning light intensity distribution within each pixel element of the detector array 22 in scanner 20. In a most preferred embodiment of the present invention, as seen in FIG. 2 this subpixel light intensity information is provided by the use of a two dimensional position sensitive detector array 24. Each position sensitive detector 26 in the two dimensional array 24 has a p-layer 52 (formed from conventional p-type doped semiconductive material), an i-layer 54 (formed from conventional intrinsic semiconductive material), and an n-layer 56 (formed from conventional n-type doped semiconductive material), that together operate as a p-i-n junction device. When visible light or other type of incident radiation 50 (e.g. ultraviolet, infrared, etc.) strikes a suitably voltage biased position sensitive detector 26, electron-hole charge pairs are generated in the i-layer 54. The electrons are separated from the holes by the electric field between the p-layer and the n-layer, with electrons tending to flow toward the n-layer 56 and holes tending toward the p-layer 52. The electrons in the n-layer then flow to edge contacts 61, 63, 65, or 66 (all held at ground potential) with currents 60, 62, 64, and 66 generated at each edge contact linearly proportional to the distance between the point of charge generation (corresponding to the point of incident light) and the respective edge contact. As those skilled in the art will appreciate, various enhancements, modifications, or adjustments to the materials or construction of the described position sensitive detectors can be made, for example, to improve light capture, extend light frequency sensitivity, optimize response time, or enhance linearity of light/current response. For example, additional lateral conducting layers such as cermets or indium tin oxide can be included to reduce charge collection times.

For use in scanners, a position sensitive detector array embodiment in accordance with the present invention will generally have individual position sensitive detectors sized to be less than 500 microns, with detectors sized in the 50 to 150 micron range being typical. Position sensitive detectors having the foregoing approximate size ranges can be grouped into two dimensional arrays that would permit 100 to 600 spot per inch image capture over an area the size of a printed page, or grouped in linear arrays that can be used to scan a page at a similar resolution. Each position sensitive detector 26 in the array 24 sends digitized signals corresponding to the four received currents 60, 62, 64, and 66 to be temporarily stored in memory 32 of the image processing assembly 30.

Operation of light intensity unit 33, moment calculation unit 34, and the gray level rendering unit 36 generally proceeds as follows:

A. Use digital representations stored in memory 32 to determine $I_0$ (total intensity) in the light intensity unit 33;

B. Use digital representations in memory 32 to determine x and y moments (centroid) of the intensity distribution incident on each detector;

C. If the magnitude of the centroid is large, use gray level rendering unit 36 to render area as an edge, using contextual gray values of adjacent detectors, and interpolating if necessary. This information is used to find edge parameters, giving the actual edge position and allowing rendering of the edge between two gray levels G1 and G2 with subpixel precision.

D. If the magnitude of the centroid is small, determine pixel intensity and render area as a non-edge, typically using a bilinear model.

As will be appreciated by inspection of FIG. 1, operations A and B can be determined concurrently, and results of both must be available for operation of either C or D. Concurrent or parallel operation reduces image processing time, as does the local scope of the procedure, which does not require extensive sampling of adjacent pixels during image rendering. In addition, operation of the present invention does not require much contextual information concerning light intensity in nearby pixels, typically requiring only gray level information from at most two adjacent pixels, and often requiring information from only one adjacent pixel. Again, this reduces processing time, and has the additional advantage of reducing overall image errors. Since local errors in rendering do not propagate outside the detector area (a single pixel), the possibility of creating visually perceptible artifacts during rendering are greatly reduced as compared to global image rendering techniques that are not as highly parallel and must sample many distantly located pixels.

More specifically, operation of the light intensity unit 33 to determine a total light intensity in each pixel and a moment calculation unit 34 to determine the centroid of light intensity within each pixel is based on the received information held in memory 32. Light intensity within each pixel of a bitmap representing the detected light intensity by each position sensitive detector is simply proportional to the summed values of either current inputs 60 and 64, or alternatively, current inputs 62 and 66. In a typical application, this total detected current output can be digitally converted to an 8-bit light intensity representation (0–255 range), suitable for representing black and white continuous and halftone applications, as well as text and line art. Color bitmaps can be created by scanning with 8-bit precision at multiple frequency ranges, and of course as those skilled in the art will appreciate, scanning resolution can be varied to match effective resolution of output devices (printers, CRT monitors, etc.), or to meet speed criteria or memory limitations, with coarser image resolutions or black and white images requiring substantially less time and memory to scan, process, and render.

Figure 3:
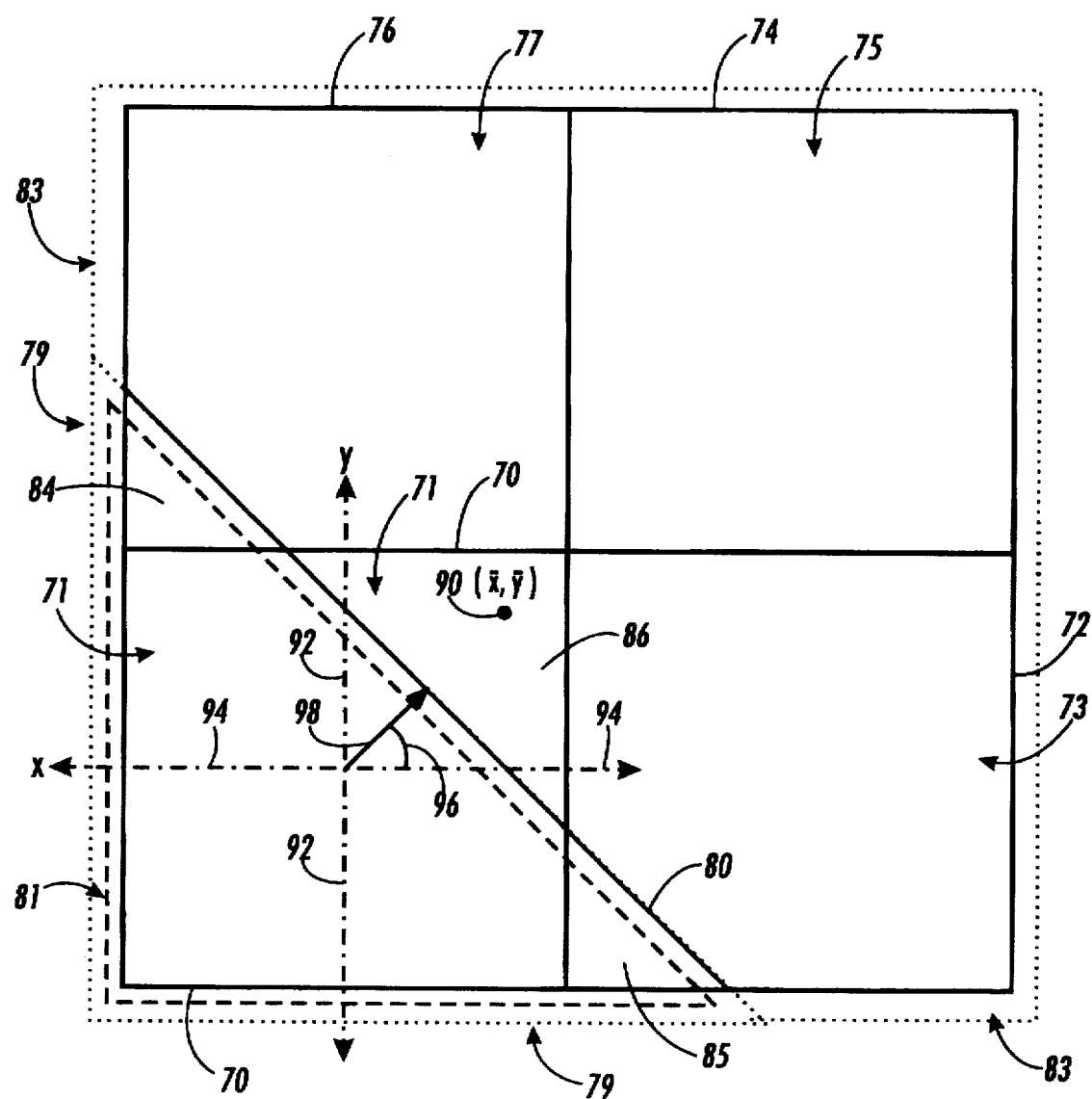
FIG. 3 illustrates a more detailed outline of four detector elements, with a coordinate system overlying one to illustrate determination of a centroid (x,y) and determination of edge parameters.

Determining a centroid of light intensity for each pixel in a bitmap with the moment calculation unit 34 is best illustrated with reference to FIG. 3, which schematically shows four adjacent position sensitive detectors 71, 73, 75, and 77. As illustrated, there are two distinct gray levels of illumination of the detectors, with a dotted outline marking an area 81 illuminated at a first gray level 79 and a remaining area 82 illuminated at a second gray level 83. An edge 80 demarcates a boundary between the first gray level 79 and the second gray level 83. Detector 75 is completely illuminated at a certain intensity to have a determined gray level 74 (corresponding to gray level 83) over its entire detector surface. Detector 73 is nearly completely illuminated, with a majority of its area maintained at a second gray level 83, while a minor portion on the opposite side of edge 80 illuminated at a first gray level 85 (corresponding to gray level 79). Since detector 73 is not completely illuminated at a constant gray level like detector 75, it has an overall (integrated) gray level 72 (derived from opposing current inputs 60 and 64 or 62 and 66, as discussed with reference to FIG. 2) slightly different than gray level 83. Similarly, since detector 77 also has a majority of its area maintained at a second gray level 83, while a minor portion on the opposite side of edge 80 illuminated at a first gray level 79, it also has an overall (integrated) gray level 76 slightly different than gray level 83. Finally, detector 71 is predominantly illuminated at first gray level 79 (note that this can be considered to correspond to $G_1$ in the following discussion of centroid calculation for the general case), with a minor portion illuminated at gray level 86 (corresponding to second gray level 83, that in turn corresponds to $G_2$ in the following discussion of centroid calculation for the general case), to provide an overall (integrated) gray level 70 (corresponding to $I_0$ in following discussion of centroid calculation for the general case) the detector 71.

To better comprehend determination of a centroid of light intensity 90 and edge determination at subpixel precision, detector 71 has been overlain with an x-axis 94 and a y-axis 92, having an origin centered on the detector 71 and respective x and y axes parallel to edges of detector 71 as illustrated. The x-axis 94 magnitude is taken to be between −1 and 1 at opposing edges of the detector surface, while the y-axis 92 is similarly scaled to have a magnitude between −1 and 1 at opposing edges of the detector. Parameters defining location of the edge 80 with respect to the coordinate x and y axes 94 and 92 include a radius line 98 drawn from the origin to meet perpendicular to edge 80, and an angle 96 defining the direction radius line 98 extends to meet edge 80. In a preferred embodiment according to the present invention, the edge parameters (radius line 98 and angle 96) are derived from first moments of the current intensity in the x and the y direction (the centroid 90, x and y), along with the integrated gray level (gray level 70 in this example). If the magnitude of the centroid (equivalent to $(X^2+y^2)^{1/2}$, where the absolute value of x and y varies between 0 and 1) is relatively large, being greater than about ⅓, the edge 80 is rendered, while for small magnitude centroids less than ⅓ it is assumed that the detector has a substantially constant gray level, and does not have any edges to render. In that event, a standard intensity model can be used to determine the intensity rendering of the pixel. One convenient rendering model suitable for use in the present invention is a conventional plane model. The intensity of the pixel is fitted to the form $I(x,y)=Ax+By+I_0$, where the constants A and B are proportional to the x moment and the y moment, respectively. Of course, other conventional rendering models for determining intensity of pixels having no subpixel edges can also be used as desired.

If the magnitude of the centroid is large, requiring rendering of an edge to provide subpixel accuracy, certain simplifying assumptions must be made. To permit a unique solution, it can be assumed that there is no more than one edge between gray levels incident on the detector, at least one gray level is 0 (black, no incident illumination), and that all edges are linear. Under these assumptions, and with the foregoing information, it is possible from the centroid of light intensity 90 to exactly determine the edge parameters with subpixel precision. To ensure computational efficiency, the edge parameters (radius line 98 and angle 96) are not analytically computed de novo for each detector, but instead are determined after reference to a precalculated lookup table that provides edge parameters in response to x and y moment input, and gray level information input. For example, a lookup table having precalculated functions that provide the centroid given inputs for the angle radius line 98, angle 96, and area of the detector 71 having gray level 86 can be used. As will be appreciated, lookup table interpolation, semi-analytic techniques, or other numerical approximation techniques can of course be used.

For the more general case where one side of an edge is not known to be black (non-illuminated), a more complex calculation is needed to determine the centroid and the associated edge parameters in terms of a gray-gray step distribution. Calculation of the x and y moments for this more general case proceeds as follows:

$$\bar{x} = \frac{\int_{-1}^{1}\int_{-1}^{1} xI(x,y)dxdy}{\int_{-1}^{1}\int_{-1}^{1} I(x,y)dxdy} =$$

$$\frac{\int_{-1}^{1}\int_{-1}^{1} x[I'(x,y) + G_1]dxdy}{I_0} =$$

-continued $$\bar{x} = \frac{\int_{-1}^{1}\int_{-1}^{1}[\Gamma(x,y)]dxdy}{I_0}$$

where Γ(x,y) is the black-gray intensity distribution because $$\bar{x} = \frac{\int_{-1}^{1}\int_{-1}^{1}x\Gamma(x,y)dxdy}{\int_{-1}^{1}\int_{-1}^{1}\Gamma(x,y)dxdy} \quad \int_{-1}^{1}\int_{-1}^{1}x\Gamma(x,y)dxdy =$$

$$\bar{x}\int_{-1}^{1}\int_{-1}^{1}\Gamma(x,y)dxdy$$

and $$\int_{-1}^{1}\int_{-1}^{1}xG_1dxdy = G_1\int_{-1}^{1}\int_{-1}^{1}xdxdy = 0$$

In addition, we can use the relation $$\int_{-1}^{1}\int_{-1}^{1}I(x,y)dxdy = \int_{-1}^{1}\int_{-1}^{1}[\Gamma(x,y)+G_1]dxdy =$$

$$\int_{-1}^{1}\int_{-1}^{1}\Gamma(x,y)dxdy + \int_{-1}^{1}\int_{-1}^{1}G_1dxdy$$

to rewrite the expression for the gray-gray moment $\bar{x}$ as:

$$\bar{x} = \bar{x}'\frac{\int_{-1}^{1}\int_{-1}^{1}I(x,y)dxdy - I_{G1}}{I_0} = \bar{x}'\left(\frac{I_0 - I_{G1}}{I_0}\right)$$

where $$I_{Ga} = \int_{-1}^{1}\int_{-1}^{1}G_1dxdy = 4G_1$$

corresponds to the total intensity of a detector covered entirely by intensity $G_1$. Thus, one finally obtains for $\bar{x}'$, the moment of the gray-black distribution, the relation $$\bar{x}' = \bar{x}\left(\frac{I_0}{I_0 - I_{G1}}\right)$$

in terms of the gray-gray moment. The y moment can be transformed in the same way by $$\bar{y}' = \bar{y}\left(\frac{I_0}{I_0 - I_{G1}}\right)$$

The values $\bar{x}'$, $\bar{y}'$ correspond to the moment values if $G_1$ had been zero (i.e., if the distribution had been that of a black and gray edge). Because we can find the location of the edge precisely when given the moments of a black/gray edge, we can use these transformed moments to precisely determine the location of the gray-gray edge. If $I_{G1}$ is not available, the transformation of the x and y moments can be performed using $I_{G2}$ in place of $I_{G1}$. Γ(x,y) is then defined as being $(G_1-G_2)$ (which is negative) for points (x,y) below and to the left of edge 80 and for points (x,y) above and to the right of edge 80 in detector 71.

As will be appreciated from the foregoing, in the general case of gray-gray edges both the x and y moments and either $I_{G1}$ or $I_{G2}$ are required to perform the transformations described above for centroid determination. Fortunately, either $I_{G1}$ or $I_{G2}$ can be closely estimated given "contextual" knowledge of the neighboring gray levels. In the present example shown in FIG. 3, this gray level context is provided by neighboring detectors 73 and 77, both of which predominantly have each side of 83. Ideally, nearby detectors on each side of the edge will have the same intensity as the respective side of the edge. For example, we would find a detector nearby with uniform intensity distribution I(x,y)= $G_1$. Then the total intensity of that detector, $I_0$, would be $I_{G1}$, the gray value needed to transform the moments and render the edge precisely. If the features in the image are widely spaced, such a detector can be easily found by choosing the nearest neighbor in the direction normal to the edge. Because either intensity will suffice, we can use $I_{G2}$ instead of $I_{G1}$ if the detector on the low-intensity side of the edge contains an edge. In a more typical case where an unambiguous gray level does not exist because the neighboring detectors have differing levels (e.g. gray levels 72 and 76 for respective detector 73 and 75 are not identical), an average or interpolated value between the two gray levels can be used.

To determine the edge parameters after computation of the centroid 90, it is still necessary to have the value of $G_2$, assuming $G_1$ is used for context. It is possible to determine this value without any additional information. It is known that the total intensity over the detector is $$I_0 = \int_{-1}^{1}\int_{-1}^{1}I(x,y)dxdy = \int_{A_{G1}}\int G_1dxdy + \int_{A_{G2}}\int G_2dxdy$$

where $A_{G1}$ and $A_{G2}$ are the regions on the two sides of the edge. Because the intensities are constant over this region, and the areas of the two regions must add up to $A_d$, the total area of the detector, we can simplify this to:

$$I_0 = A_{G1}G_1 + (A_d - A_{G1})G_2$$

$A_{G1}$ can be easily calculated, since we have already determined the position of the edge. We can now solve for $G_2$:

$$G_2 = \frac{I_0 - A_{G1}G_1}{A_d - A_{G1}}$$

This provides the necessary information to determine the edge parameters needed for subpixel rendering of edges.

To better understand the present invention, the following pseudocode presents one embodiment of a simulation of a position sensitive detector array operating in accordance with the foregoing described steps to process images:

```
Integer N/*NXN is the number of pixels in the position sensor array*/
(1:N,1:N,1:4) array currents/*the array of currents from the array of position sensitive
    sensors four currents per sensor*/
(1:M*N,1:M*N) array finalimage/*array of final image of size MNXMN*/
Main()
{GetCurrentArray(current)
Loop (EachDetectorInArray){
averagecurrent=(current1+current2+current3 +current4)/4
ycentroid=(current1-current2)/(current1 +current2)
xcentroid=(current3-current4)/(current3 +current4)
If(magnitude(xcentroid,ycentroid)<small)
{parameters=ComputePlaneModelParameters(average,xcentroid,ycentroid)
finalimage=RenderPlaneModel(parameters)
}
Else
{If(GrayValuesAreGlobal)
{grayvalues=GetGlobalGrayValues}
Else
{normaldirection=FindNormalDirection(averagecurrent,xcentroid,ycentroid)
grayvalues=FindGrayValue(normaldirection,pixelneighbors)
}
newcentroids=CorrectMoments(grayvalues)
stepedgeparameters=FindEdgeParameters(newcentroids,grayvalues)
finalimage=RenderEdgeModel(stepedgeparameters)
}
}
```

Figure 4:
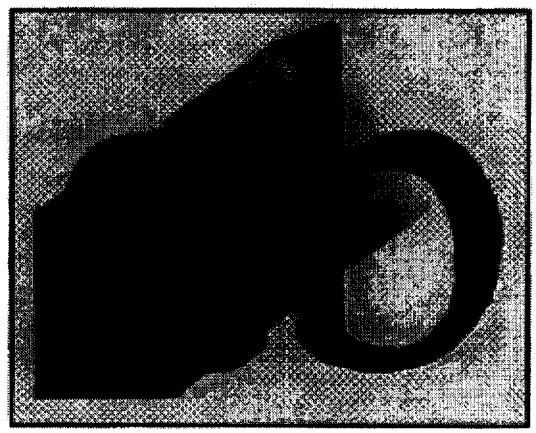
FIG. 4 is an original continuous tone image.
Figure 5:
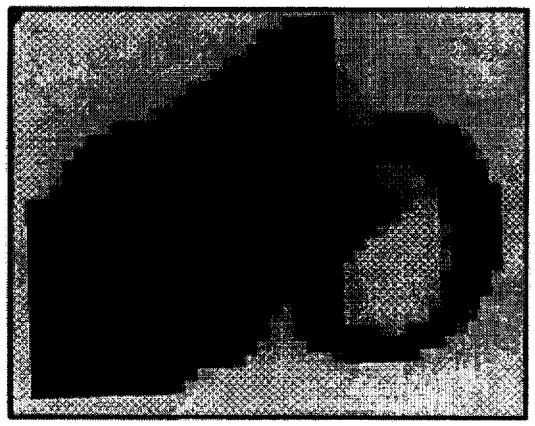
FIG. 5 is a rendered image of a scan of the image in FIG. 4 using standard detectors and gray modeling.
Figure 6:
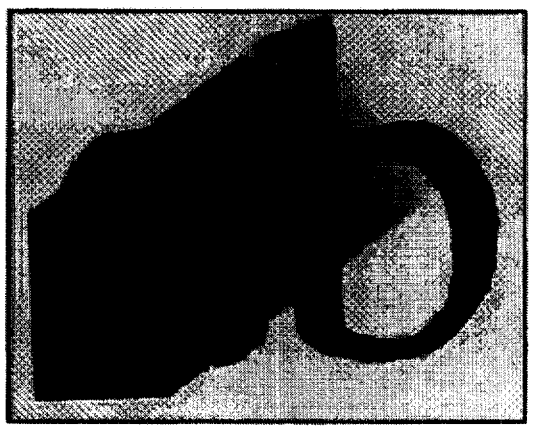
FIG. 6 is a rendered image of a scan of the image in FIG. 4 using position sensitive detectors operating with subpixel precision in accordance with the image processing system of the present invention.

As will be appreciated, rendering an image in accordance with the present invention is most useful when an image is rendered for a specific device (by device specific conversion unit 38 of FIG. 1) at a high enough resolution to permit display of the determined edge parameter (sub-pixel) information. Typically, rendering at two or more times the original scanned resolution (as measured with respect to the detector size) illustrates the substantial improvement in edge rendering for the present system and technique as compared to conventional rendering techniques that do not use subpixel information to generate a rendered image. This is best seen by comparison of FIGS. 4, 5, and 6, with FIG. 6 being created through application of software implementing the foregoing described pseudocode to simulate position sensitive detectors operating in a mode consistent with present invention. FIG. 4 illustrates an original continuous tone image, and FIG. 5 illustrates a scanned and rendered (300 dpi) image of FIG. 4 using a average intensity rendering model (gray model). In comparison, FIG. 6 illustrates a scanned and rendered image using techniques and information applicable to position sensitive detectors rendering images in accordance with present invention. As is apparent, in comparison to conventional prior art rendering of FIG. 5, the image seen in FIG. 6 more smoothly renders edges in the text feature (the letter "b") and presents less "blocky" gray level transitions in the continuous tone features.

If information regarding subpixel edge features is stored and made available for analysis, auto-segmentation techniques suitable for use in conjunction with optical character recognition machines may be available. For example, text features generally have a higher incidence of subpixel edge features than continuous tone features. This statistical difference can be used to automatically separate text from pictures in scanned images. As compared to prior art schemes that only detect well separated (block segmentation) units of text or pictures, the present invention permits autosegmentation even when the text is embedded in continuous tone images.

As those skilled in the art will appreciate, other various modifications, extensions, and changes to the foregoing disclosed embodiments of the present invention are contemplated to be within the scope and spirit of the invention as defined in the following claims.

The claimed invention is:

1. An image detection and pixel processing system comprising
    a plurality of position sensitive detector elements arranged to receive an image, with each position sensitive detector element providing information for determining both a total light intensity value within the position sensitive detector element and a centroid of light intensity indicative of light intensity position within the position sensitive detector element, and
    an image processing assembly connected to receive information from the plurality of position detector elements, the image processing assembly relating a pixel and its encompassed subpixel area to each corresponding position detector element, and further determining the total light intensity within the pixel and the centroid of light intensity within the subpixel area, with the image processing assembly rendering each subpixel area as an edge when magnitude of the centroid of light intensity is large, and wherein the image processing assembly renders the subpixel area as an edge by finding a first gray value on a first side of the edge, determining actual edge position, and using actual edge position and the first gray value to determine a second gray value on a second side of the edge opposite the fist side of the edge.

2. The image detection and pixel processing system of claim 1, wherein determining actual edge position further comprises partially determining parameterization of the edge using gray-on-gray moments, and converting gray-on-gray moments to gray-on-black to uniquely define edge location.

3. The image detection and pixel processing system of claim 2, wherein partially determining parameterization of the edge using gray-on-gray moments further comprises use of lookup tables generated to map moments of the centroid of light intensity onto an edge parameter.

4. The image detection and pixel processing system of claim 1, wherein finding the first gray value is determined using context of an adjacent position sensitive detector element.

5. The image detection and pixel processing system of claim 1, wherein finding the first gray value is an estimate based on interpolation of gray values of two adjacent position sensitive detector elements.

6. The image detection and pixel processing system of claim 1, wherein the image processing assembly renders the subpixel area as an edge when the magnitude of the centroid of light intensity is greater than about $1/3$.

7. An image processing method using information obtained from a plurality of position sensitive detector elements arranged to receive an image, the method comprising the steps of determining a total light intensity value within each of said position sensitive detector elements, determining a centroid of light intensity indicative of light intensity position within each of said position sensitive detector elements, relating a pixel and its encompassed subpixel area to each of said corresponding position detector element to determine the total light intensity within the pixel and the centroid of light intensity within the subpixel area, and rendering each subpixel area as an edge when magnitude of the centroid of light intensity is large, and evaluating the subpixel area to determine an edge, finding a first gray value on a first side of the edge, determining actual edge position, and using actual edge position and the first gray value to determine a second gray value on a second side of the edge opposite the first side of the edge.

8. The image processing method of claim 7, wherein the step of determining actual edge position further comprises the steps of partially determining parameterization of the edge using gray-on-gray moments, and converting gray-on-gray moments to gray-on-black to uniquely define edge location.

9. The image processing method of claim 8, wherein the step of partially determining parameterization of the edge using gray-on-gray moments further comprises the step of mapping moments of the centroid of light intensity onto an edge parameter using generated lookup tables.

10. The image processing method of claim 7, wherein the step of finding the first gray value further comprises the step of evaluating gray value context of an adjacent position sensitive detector element.

11. The image processing method of claim 7, wherein the step of finding the first gray value further comprises the step of estimating gray value context based on interpolation of gray values of two adjacent position sensitive detector elements.

* * * * *